US011893128B2

(12) United States Patent
Liu et al.

(10) Patent No.: US 11,893,128 B2
(45) Date of Patent: Feb. 6, 2024

(54) DATA QUERY AGAINST AN ENCRYPTED DATABASE

(71) Applicant: International Business Machines Corporation, Armonk, NY (US)

(72) Inventors: Yi Liu, Beijing (CN); Shao Mei Ji, Beijing (CN); Peng Hui Jiang, Beijing (CN); Jin Shan Li, Beijing (CN); Jian Jiao Wen, Shanghai (CN); Yuan Yuan Jia, Beijing (CN); Li Wei Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 17/346,323

(22) Filed: Jun. 14, 2021

(65) Prior Publication Data

US 2022/0405416 A1    Dec. 22, 2022

(51) Int. Cl.
*G06F 21/62*    (2013.01)
*G06F 16/215*    (2019.01)
*G06F 21/60*    (2013.01)

(52) U.S. Cl.
CPC ........ *G06F 21/6227* (2013.01); *G06F 16/215* (2019.01); *G06F 21/602* (2013.01)

(58) Field of Classification Search
CPC ... G06F 21/6227; G06F 16/215; G06F 21/602
See application file for complete search history.

(56) References Cited

U.S. PATENT DOCUMENTS

| 6,847,966 B1* | 1/2005 | Sommer | G06F 16/3347 |
| | | | 707/999.005 |
| 8,788,701 B1* | 7/2014 | Byrnes | G06F 16/35 |
| | | | 709/231 |
| 10,489,604 B2* | 11/2019 | Yoshino | G06F 21/6227 |
| 10,528,557 B1 | 1/2020 | Chmil | |
| 2007/0276881 A1* | 11/2007 | Gruhl | G06F 16/319 |
| | | | 707/999.203 |

(Continued)

OTHER PUBLICATIONS

"Secure Search Over Encrypted Data", Jul. 23, 2019, 13 pages, <https://www.cossacklabs.com/blog/secure-search-over-encrypted-data-acra-se.html>.

(Continued)

*Primary Examiner* — Jung W Kim
*Assistant Examiner* — Alan L Kong
(74) *Attorney, Agent, or Firm* — David B. Woycechowsky (57) ABSTRACT

A query string for an encrypted database storing a plurality of encrypted data records is received from a requestor. The query string is segmented to obtain at least one word. The at least one word is encrypted with the irreversible encryption algorithm to obtain at least one encrypted word. At least one first encrypted item with a co-occurrence weight higher than a preset threshold based on the at least one encrypted word and a co-occurrence statistics model is acquired. The co-occurrence statistics model is built to provide co-occurrence weights, each indicating a probability that the at least one encrypted word appears in a first encrypted data item of the plurality of encrypted data records. At least one second encrypted data item corresponding to the at least one first encrypted data item is acquired from the plurality of encrypted data records.

3 Claims, 7 Drawing Sheets

(56) References Cited

U.S. PATENT DOCUMENTS

| | | | |
|---|---|---|---|
| 2013/0238646 A1* | 9/2013 | Maro | G06F 21/6227 |
| | | | 707/E17.135 |
| 2014/0052999 A1* | 2/2014 | Aissi | G06F 16/22 |
| | | | 713/189 |
| 2015/0012564 A1 | 1/2015 | Litherland | |
| 2016/0103920 A1* | 4/2016 | Lee | G06F 16/2428 |
| | | | 707/765 |
| 2016/0232362 A1 | 8/2016 | Conway | |
| 2017/0060940 A1 | 3/2017 | Baessler | |
| 2017/0364450 A1* | 12/2017 | Struttmann | H04L 63/123 |
| 2019/0087900 A1* | 3/2019 | Crowley | G06Q 40/04 |

OTHER PUBLICATIONS

Cao et al., "A Novel Fuzzy Search Approach over Encrypted Data with Improved Accuracy and Efficiency", arXiv:1904.12111v2 [cs.CR] Jun. 21, 2019, 13 pages.

Tariq et al., "Secure keyword search using dual encryption in cloud computing", Accepted: Jan. 18, 2018, 11 pages, <https://www.researchgate.net/publication/322691460>.

Mell et al., "The NIST Definition of Cloud Computing", Recommendations of the National Institute of Standards and Technology, NIST Special Publication 800-145, Sep. 2011, 7 pages.

* cited by examiner

DATA QUERY AGAINST AN ENCRYPTED DATABASE

BACKGROUND

The present invention relates generally to data security and more specifically to a data query against an encrypted database.

Cloud services are gaining popularity with enterprises for cost and scalability advantages. The need to store sensitive information on an untrusted server is increasing resulting in security concerns. To ensure data security, data is encrypted in transit and at rest, which is guaranteed by cloud applications and storage/database providers. Moreover, some sensitive fields must be encrypted when data is stored permanently into cloud databases. Although a wide variety of methodologies for indexing and searching records (including plain texts) exists, these methodologies may not be applicable for encrypted data.

SUMMARY OF THE INVENTION

Embodiments of the present invention disclose methods, systems, and computer program products for data query against an encrypted database. According to an embodiment of the present invention, a query string for an encrypted database storing a plurality of encrypted data records is received from a requestor. The plurality of encrypted data records are obtained through encryption of a plurality of original data records, each of the plurality of encrypted data records comprises a first encrypted data item and a second encrypted data item, the first encrypted data item is obtained by encrypting an original data record with an irreversible encryption algorithm, and the second encrypted data item is obtained by encrypting the original data record with a reversible encryption algorithm. The query string is segmented to obtain at least one word. The at least one word is encrypted with the irreversible encryption algorithm to obtain at least one encrypted word. At least one first encrypted item with a co-occurrence weight higher than a preset threshold based on the at least one encrypted word and a co-occurrence statistics model is acquired. The co-occurrence statistics model is built to provide co-occurrence weights, each indicating a probability that the at least one encrypted word appears in a first encrypted data item of the plurality of encrypted data records. At least one second encrypted data item corresponding to at least one first encrypted data item is acquired from the plurality of encrypted data records.

It is to be understood that the above Summary is not intended to identify key or essential features of embodiments of the present invention, nor is it intended to be used to limit the scope of the present invention. Other features of the present invention will become easily comprehensible through the description below.

DETAILED DESCRIPTION

Some embodiments will be described in more detail with reference to the accompanying drawings, in which the embodiments of the present invention have been illustrated. However, the present invention can be implemented in various manners, and thus should not be construed to be limited to the embodiments disclosed herein.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. The cloud computing model may include at least five characteristics, at least three service models, and at least four deployment models.

Characteristics are as follows:

On-demand self-service: a cloud consumer can unilaterally provision computing capabilities, such as server time and network storage, as needed, automatically, without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical resources and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure which includes the network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including the networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
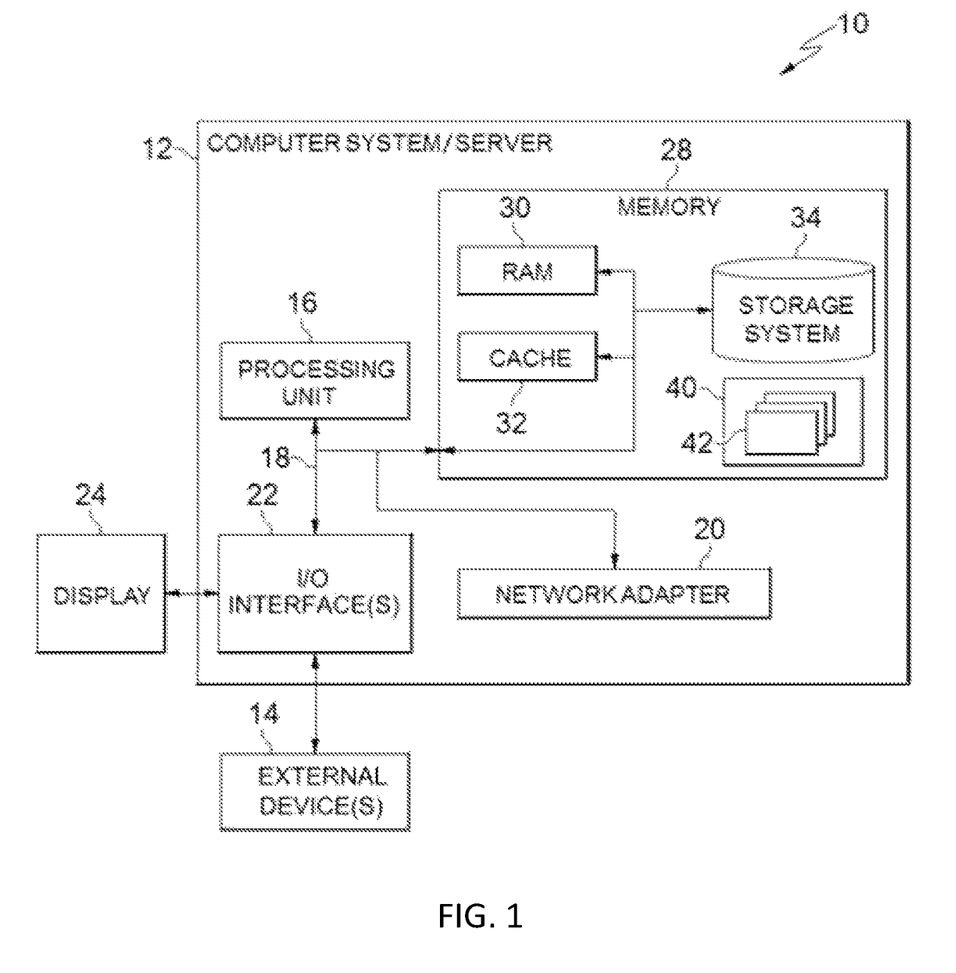
FIG. 1 depicts a cloud computing node, according to some embodiments of the present invention.

Referring now to FIG. 1, a schematic of an example of a cloud computing node is depicted. Cloud computing node 10 is only one example of a suitable cloud computing node and is not intended to suggest any limitation as to the scope of use or functionality of embodiments of the invention described herein. Cloud computing node 10 is capable of being implemented and/or performing any of the functionality set forth hereinabove.

Cloud computing node 10 includes computer system/server 12 (e.g., a portable electronic device such as a communication device), which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, memory 28, and bus 18 that couples various system components including memory 28 to processing unit 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a compact disc read-only optical memory (CD-ROM), a digital versatile disc-read only memory (DVD-ROM), or other optical media can be provided. In such instances, each can be connected to bus 18 by one or more data media interfaces. As will be further depicted and described below, memory 28 may include at least one program product having a set (i.e., at least one) of program modules that are configured to carry out the functions of embodiments of the invention.

Program/utility 40, having a set (i.e., at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Further, computer system/server 12 can communicate with one or more networks such as a local area network (LAN), a general wide area network (WAN), and/or a public network (e.g., the Internet) via network adapter 20. As depicted, network adapter 20 communicates with other components of computer system/server 12 via bus 18. It should be understood that although not shown, other hardware and/or software components may be used in conjunction with computer system/server 12. Examples include, but are not limited to: microcode, device drivers, redundant processing units, external disk drive arrays, redundant array of independent disks (RAID) systems, tape drives, data archival storage systems, etc.

Figure 2:
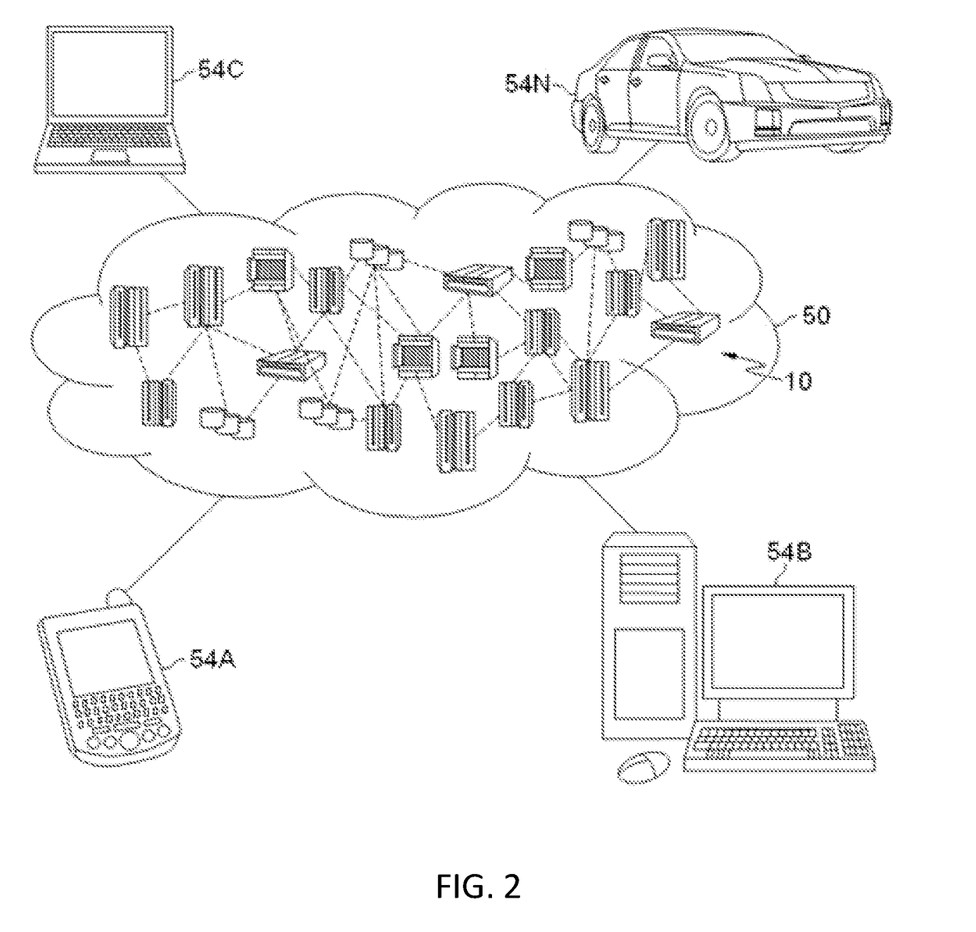
FIG. 2 depicts a cloud computing environment, according to some embodiments of the present invention.

Referring now to FIG. 2, cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that cloud computing nodes 10 and cloud computing environment 50 can communicate with any type of computerized device over any type of network and/or network addressable connection (e.g., using a web browser).

Figure 3:
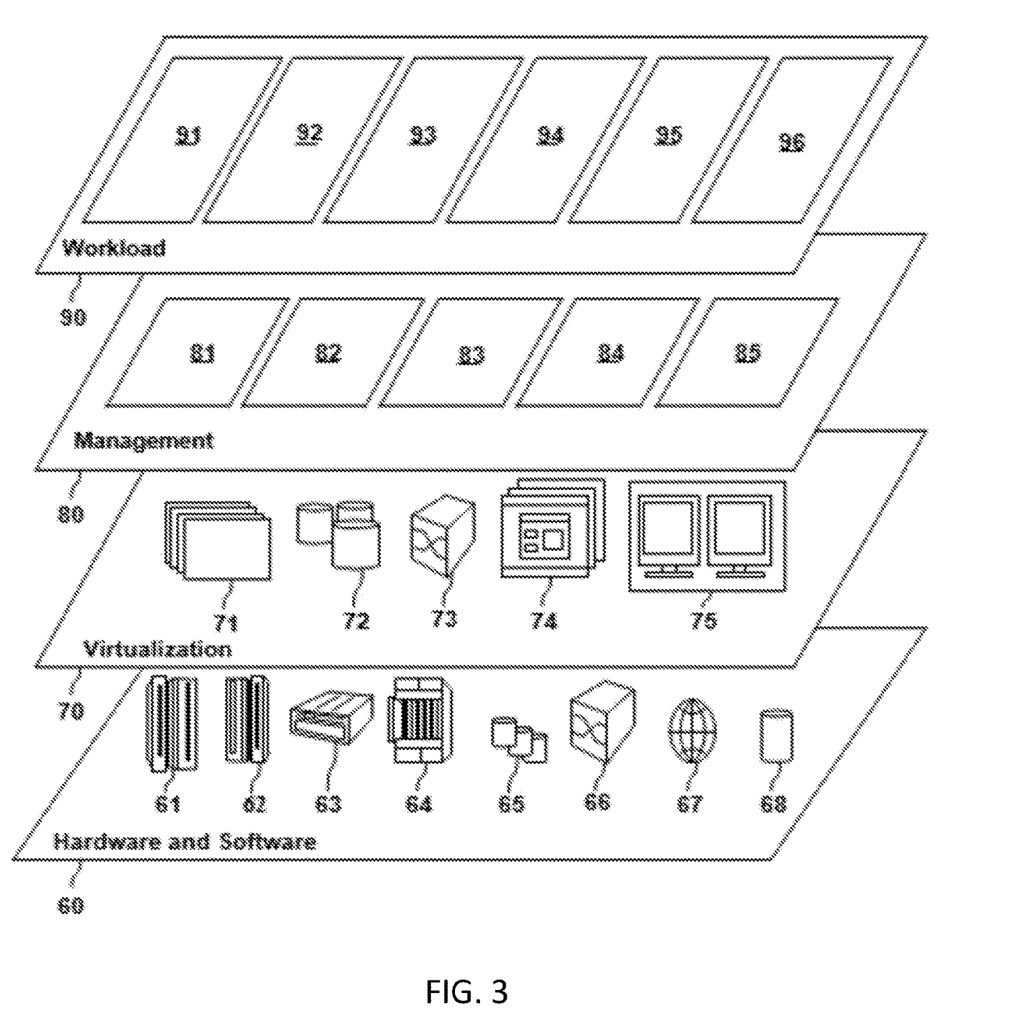
FIG. 3 depicts abstraction model layers, according to some embodiments of the present invention.

Referring now to FIG. 3, a set of functional abstraction layers provided by cloud computing environment 50 (of FIG. 2) is shown. It should be understood that the components, layers, and functions shown in FIG. 3 are intended to be illustrative only, and embodiments of the present invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data query 96.

It should be noted that the data query method according to embodiments of this invention may be implemented by computer system/server 12 of FIG. 1.

As noted above, conventional methodologies are not workable to search an encrypted database. In order to address this problem, one solution is to decrypt the encrypted data before a data query. Then the data query is performed on the decrypted data, which is time consuming and results in poor real-time performance. Another solution is to index the unencrypted data in a database. Then a data query is performed on the unencrypted index, which leads to poor data security.

In order to at least partially solve the above problems and other potential problems, embodiments of the present invention provide a solution for searching an encrypted database. This solution may index and search the encrypted data in a database without decrypting the encrypted data, which guarantees data security in a more efficient manner.

Figure 4:
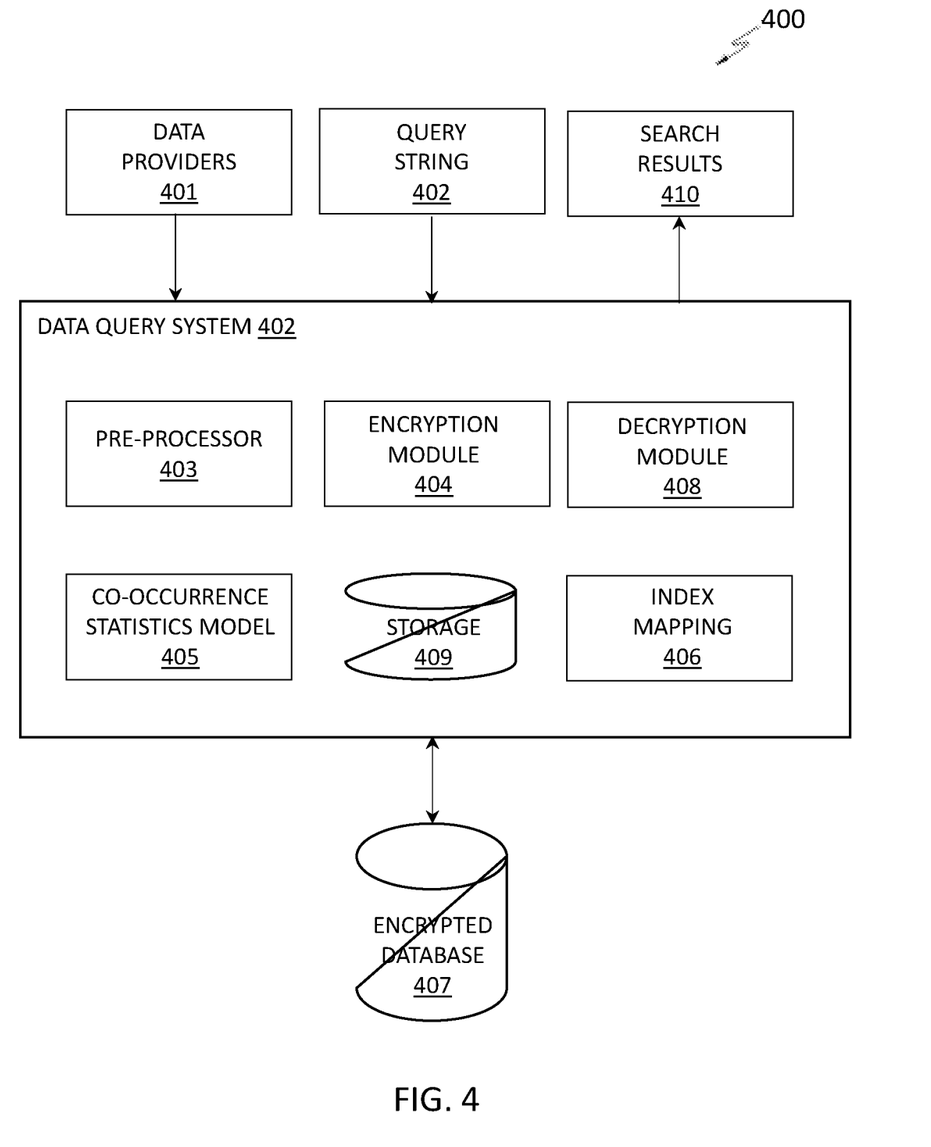
FIG. 4 depicts an example system in which embodiments of the present invention can be implemented, according to some embodiments of the present invention.

With reference now to FIG. 4, an example system 400 in which embodiments of the present invention can be implemented is depicted. It is to be understood that the structure and functionality of system 400 are described only for the purpose of illustration without suggesting any limitations as to the scope of the present invention. The embodiments of the present invention can be depicted with a different structure and/or functionality. For example, at least part or all of system 400 may be implemented by computer system/server 12 of FIG. 1. System 400 includes data query system 402 and encrypted database 407. Data query system 402 includes pre-processor 403, encryption module 404, co-occurrence statistics model 405, storage 409, index mapping module 406, and decryption module 408.

Figure 5:
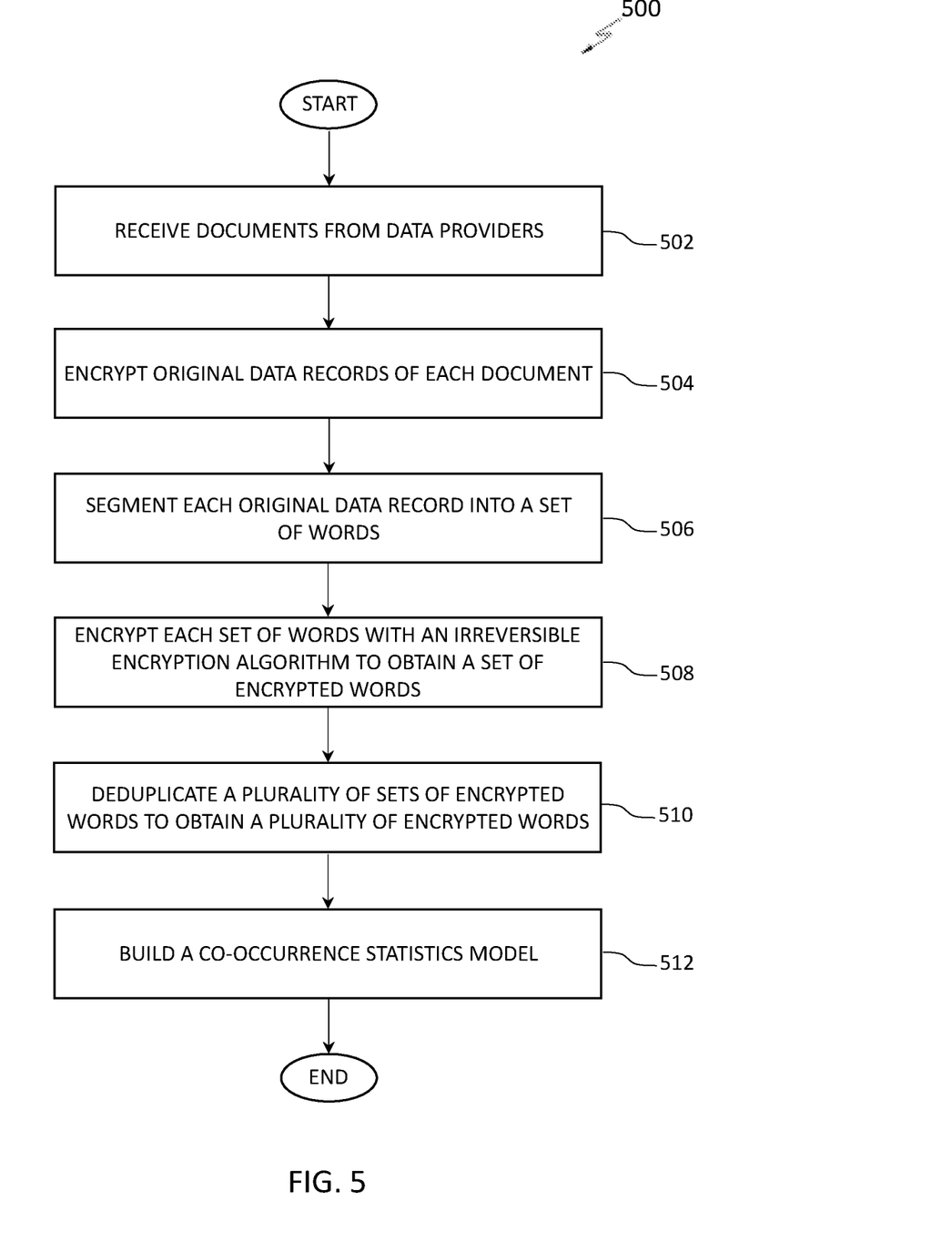
FIG. 5 depicts a flowchart for the example system, according to some embodiments of the present invention.

With reference now to FIG. 5, a flowchart of workflow 500 is depicted for an example system according to some embodiments of the present invention. Workflow 500 may be implemented by system 400. Workflow 500 comprises steps 502-512.

At step 502, system 400 receives documents from data providers 401. For example, documents in JSON format may be transmitted from data providers 401 to data query system 402. Each of the documents may be stored as a plurality of data records in encrypted database 407. According to configurations of encrypted database 407, some of the plurality of data records may be encrypted data records. An encrypted data record may include sensitive data (such as personal information, financial information, and protected information received from a data provider) and other types of data that have been encrypted. For example, an encrypted data record may comprise a user's full name, credit card number, health records, driver's license number, password, etc.

At step 504, system 400 via encryption module 404, encrypts original data records of each document according to configurations of encrypted database 407. In an embodiment, encryption module 404 may encrypt an original data record with an irreversible encryption algorithm and a reversible encryption algorithm, respectively. The encrypted data record may include a first encrypted data item and a second encrypted data item. The first encrypted data item is obtained by encrypting the original data record with an irreversible encryption algorithm. The second encrypted data item is obtained by encrypting the original data record with a reversible encryption algorithm. For each original data record, a first encrypted data item and a second encrypted data item may be stored in encrypted database 407. A plurality of respective first encrypted data items for the original data records may be used as indexes for searching encrypted database 407.

In an embodiment, the irreversible encryption algorithm is a cryptographic process that transforms data deterministically to a form from which the original data cannot be recovered, even by those who have full knowledge of the method of encryption. As appreciated in the art, the irreversible encryption algorithm may include, but is not limited to, Cryptographic Hash Algorithms (CHA). Cryptographic Hash Algorithms (CHA) include secure hash algorithm (SHA)-1, SHA-256, SHA-384, SHA-512, etc. In the embodiment, the reversible encryption algorithm has the ability to decrypt the encrypted data. The reversible encryption algorithm may include, but is not limited to, Data Encryption Standard (DES), Advanced Encryption Standard (AES), etc.

By way of example, three sensitive data records (i.e., sensitive data record 1, sensitive data record 2, and sensitive data record 3) need to be encrypted with an irreversible encryption algorithm and a reversible encryption algorithm, respectively. The plain text of sensitive data record 1 is "One Bernard Baruch Way New York", the plain text of sensitive data record 2 is "42nd Street Brooklyn New York", and the plain text of sensitive data record 3 is "Metrotech Center, Brooklyn, New York". The sensitive data records 1, 2, and 3 may be encrypted using the SHA-512 cryptographic hash function to produce fixed-length hash values which respectively correspond to first encrypted data items 1, 2, and 3. A same plain text always results in a same hash value. The sensitive data records 1, 2, and 3 may be encrypted using the AES encryption algorithm to obtain cipher texts which respectively correspond to second encrypted data items 1, 2, and 3. The encryption steps are as follows:

i) Generate a cryptographic key: a Password-Based Key Derivation Function 2 (PBKDF2) function combined with a secret key, a random salt parameter, an SHA-512 pseudorandom function, and an iterations number may be used to ensure that the cryptographic key is unique. The random salt parameter is saved into encrypted database 407 for decryption. ii) Generate a cipher text: an AES block cipher combined with the cryptographic key and a unique nonce parameter may be used to encrypt sensitive data records 1, 2, and 3. The nonce parameter and the cipher text are be stored in encrypted database 407 for decryption.

iii) Generate hash values: the SHA-512 cryptographic hash function may be used to produce fixed-length hash values for sensitive data records 1, 2, and 3. The hash values are stored in encrypted database 407 creating a corpus index.

After encryption of the original data records, for each encrypted data record, system 400 via encryption module 404 may establish a first mapping between a first encrypted data item and a second encrypted data item. In an embodiment, the first mapping is depicted in a pre-defined encryption data structure. By way of example, an example encryption data structure for encrypted sensitive data records 1, 2, and 3 is shown below. In the encryption data structure, a "Cipher Object" including a first encrypted data item and a second encrypted data item is defined for each encrypted sensitive data record. The first encrypted data item includes a "hash value", and the second encrypted data item includes "text", "nonce" and "salt". The first mapping is saved in storage 409.

```
/encrypted sensitive data record 1/
Cipher Object:
{"text": "34d...541",
"nonce": "ecab3870a73a44d6582c5e7f",
"salt": "e4bc1bbbe025865fa727fe7b5090e785",
"hash value": "d1e...912"}
/encrypted sensitive data record 2/
Cipher Object:
{"text": "84b...613",
"nonce": "421dcab5568171bc5e85dc75",
"salt": "253293f61beb5b9a4ae717515e04d2e9",
"hash value": "b19...520"}
/encrypted sensitive data record 3/
Cipher Object:
{ "text": "84b...613",
"nonce": "421dcab5568171bc5e85dc75",
"salt": "253293f61beb5b9a4ae717515e04d2e9",
"hash value": "0eb...c87"}
```

At step 506, system 400 via pre-processor 403 segments each original data record into a set of words. In an embodiment, pre-processor 403 may use Natural Language Processing (NLP) technology or Named Entity Recognition (NER) technology to implement segmentation of the original data record. By way of example, the plain text of sensitive data record 1 "One Bernard Baruch Way New York" may be segmented into 6 words; i.e., One\ Bernard\ Baruch\ Way\ New\ York. The plain text of sensitive data record 2 "42nd Street Brooklyn New York" may be segmented into 5 words; i.e., 42nd\ Street \ Brooklyn\ New\ York. The plain text of sensitive data record 3 "Metrotech Center, Brooklyn, New York" may be segmented into 5 words; i.e., Metrotech\ Center\ Brooklyn\ New\ York. Therefore, for sensitive data record 1, a set of segmented words include "One", "Bernard", "Baruch", "Way", "New" and "York". For sensitive data record 2, a set of segmented words include "42nd", "Street", "Brooklyn", "New" and "York". For sensitive data record 3, a set of segmented words include "Metrotech", "Center", "Brooklyn", "New" and "York".

At step 508, system 400 via encryption module 404 encrypts each set of words with an irreversible encryption algorithm to obtain a set of encrypted words. As appreciated in the art, the irreversible encryption algorithm may include, but is not limited to, Cryptographic Hash Algorithms (CHA). Cryptographic Hash Algorithms (CHA) includes SHA-1, SHA-256, SHA-384, SHA-512, etc. By way of example, three sets of segmented words for each of sensitive data record 1, 2, and 3 are encrypted with the SHA-512 pseudorandom function to obtain three sets of encrypted words; i.e., the three sets of hash values as shown below:

```
/ a set of encrypted words for sensitive data record 1/
{"Hash value of "one": a61...a6f
Hash value of "Bernard": 3be...05c
Hash value of "Baruch": 167...b70
Hash value of "Way": 806...493
Hash value of "New":6d6...5b6
Hash value of "York": 52e...e61"}
/ a set of encrypted words for sensitive data record 2/
{Hash value of "42nd": 18d...0cf
Hash value of "Street": 05e...e52
Hash value of "Brooklyn": 3d0...36e
Hash value of "New": 6d6...5b6
Hash value of "York": 52e...e61"}
/a set of encrypted words for sensitive data record 3/
{Hash value of "Metrotech": 60d...160
Hash value of "Center": 40f...b75
Hash value of "Brooklyn": 3d0...36e
Hash value of "New": 6d6...5b6
Hash value of "York": 52e...e61"}
```

After encryption of each of the segmented words, for each encrypted data record, system 400 via encryption module 404 establishes a second mapping between a first encrypted data item and a set of encrypted words. The second mapping indicates a context relationship between the first encrypted data item and the set of encrypted words. By way of example, Table 1 depicts a second mapping between the hash value of sensitive data record 1 and the hash values of segmented words associated with sensitive data record 1. The second mapping indicates a context relationship between the hash value of sensitive data record 1 and the hash values of segmented words thereof. Similarly, Table 2 depicts a second mapping between the hash value of sensitive data record 2 and the hash values of segmented words associated with sensitive data record 2. Table 3 depicts a second mapping between the hash value of sensitive data record 3 and the hash values of segmented words associated with sensitive data record 3. Tables 1, 2, 3 (shown below) are stored in storage 409.

TABLE 1

| Hash Value of Sensitive Data Record 1 | dle . . . 912 | | | | | |
|---|---|---|---|---|---|---|
| Hash Values of Words | a61 . . . a6f | 3be . . . 05c | 167 . . . b70 | 806 . . . 493 | 6d6 . . . 5b6 | 52e . . . e61 |

TABLE 2

| Hash Value of Sensitive Data Record 2 | b19 . . . 520 | | | | |
|---|---|---|---|---|---|
| Hash Values of Words | 18d . . . 494 | 52e . . . 239 | 3d0 . . . 36e | 6d6 . . . 5b6 | 52e . . . e61 |

TABLE 3

| Hash Value of Sensitive Data Record 3 | 0eb . . . c87 | | | | |
|---|---|---|---|---|---|
| Hash Values of Words | 60d . . . 160 | 40f . . . b75 | 3d0 . . . 36e | 6d6 . . . 5b6 | 52e . . . e61 |

At step 510, system 400 via pre-processor 403 deduplicates a plurality of sets of encrypted words to obtain a plurality of encrypted words. In an embodiment, a dictionary may be created dynamically to include deduplicated encrypted words. The dictionary may be stored in storage 409. In the deduplication process, pre-processor 403 compares each encrypted word of the plurality set of encrypted words with each of the plurality of encrypted words in the dictionary. If a comparison result indicates an encrypted word is a redundant word, then pre-processor 403 does not add the encrypted word to the dictionary. If a comparison result indicates an encrypted word is not a redundant word, then pre-processor 403 adds the encrypted word to the dictionary. In this way, system 400 ensures that the dictionary does not include redundant encrypted words. As more and more documents are received, the number of the encrypted words in the dictionary increases. By way of example, an exemplary dictionary does not include other encrypted words other than the encrypted words of sensitive data records 1, 2, and 3. During the deduplication process, the hash values of words "Brooklyn", "New", and "York" may be identified as redundant encrypted words which cannot be saved in the dictionary repeatedly. Finally, the dictionary includes hash values of words "One", "Bernard", "Baruch", "Way", "New", "York", "42nd", "Street", "Brooklyn", "Metrotech", and "Center" as shown in Table 4 below.

TABLE 4

| a61 . . . a6f | "One" |
| --- | --- |
| 3be . . . 05c | "Bernard" |
| 167 . . . b70 | "Baruch" |
| 806 . . . 493 | "Way" |
| 18d . . . 0cf | "42nd" |
| 05e . . . e52 | "Street" |
| 60d . . . 160 | "Metrotech" |
| 40f . . . b75 | "Center" |
| 3d0 . . . 36e | "Brooklyn" |
| 6d6 . . . 5b6 | "New" |
| 52e . . . e61 | "York" |

At step 512, system 400 via data query system 402 builds co-occurrence statistics model 405 based on the plurality of deduplicated encrypted words and the second mapping between a plurality of first encrypted data items and respective sets of encrypted words. Co-occurrence statistics model 405 is built to provide a co-occurrence weight indicating a probability that at least one encrypted word appears in a plurality of first encrypted data items. As appreciated in the art, in Natural Language Processing (NLP), many methods may be used to compute the co-occurrence weight. For example, these methods include, but are not limited to, such methods as N-gram, Skip-gram, word2vec, etc.

Figure 6:
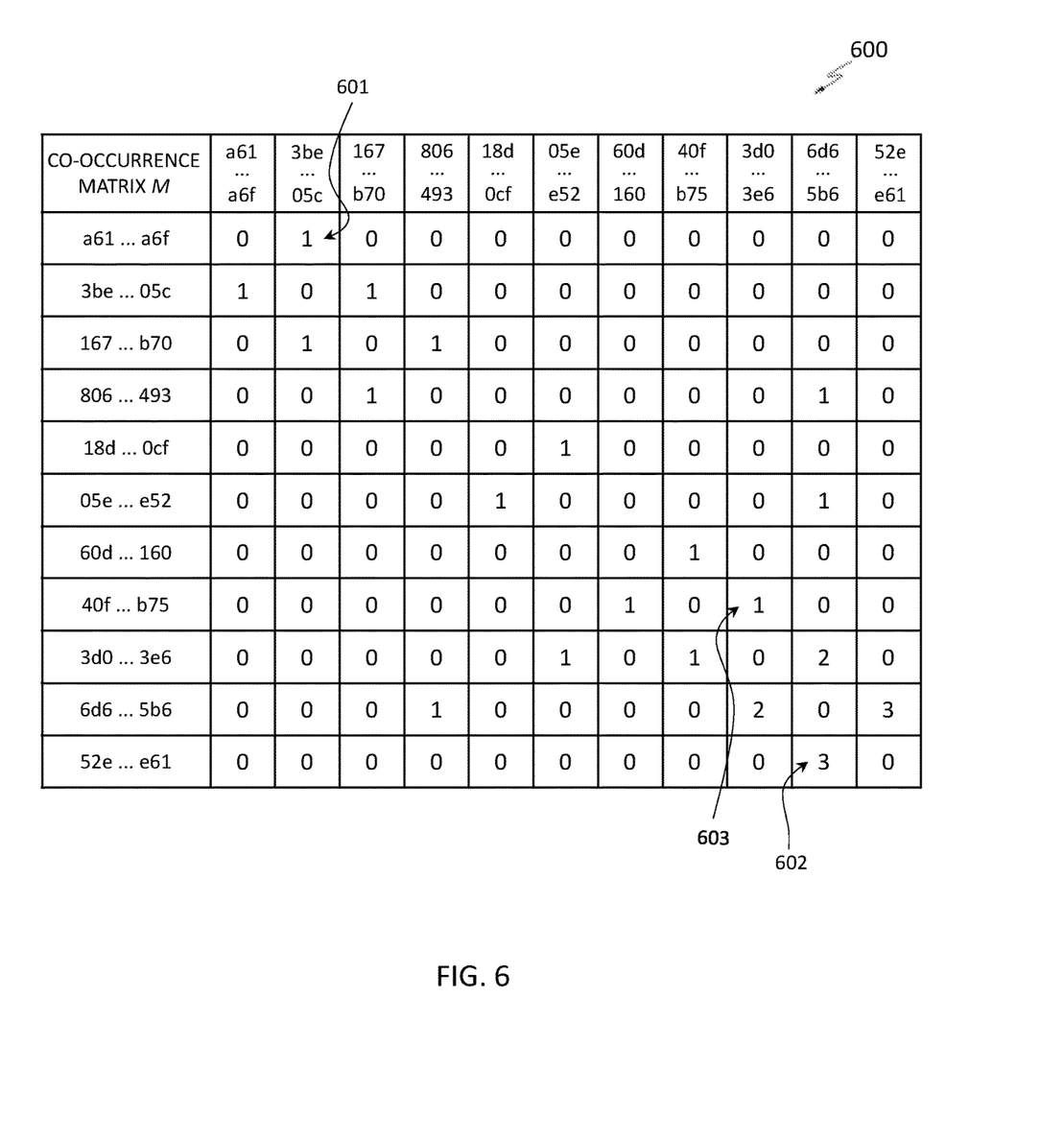
FIG. 6 depicts an example co-occurrence matrix M, according to some embodiments of the present invention.

In an embodiment, co-occurrence statistics model 405 may include a co-occurrence matrix which presents the number of times at least one word appears in a context window for a given corpus. The context window indicates the number of words to be predicted which may occur in the range of a given word. For example, given word $w_i$ occurring in the documents, a fixed window size for a context window surrounding word $w_i$ is n, which indicates word $w_j$ has n preceding words and n subsequent words in that document, (i.e., words $w_{i-n} \ldots w_{i-1} \ldots$ and $w_{i+1} \ldots w_{i+n}$). A co-occurrence matrix M is a symmetric word-by-word matrix in which $M_{ij}$ is the number of times $w_j$ appears inside $w_i$'s window among all documents. The co-occurrence matrix M has specific entities in rows (ER) and columns (EC). In an embodiment of present invention, each entity (i.e., each row and column) may be defined as an encrypted word depicting a first encrypted data item of an original data record. Given a corpus including a plurality of data records, based on a plurality of encrypted words in a dictionary, a second mapping between a first encrypted data item of each of the plurality of original data records, and the encrypted segmented words of each of the plurality of original data records, a co-occurrence matrix M may be built. By way of example, given a corpus which includes sensitive data records 1, 2, and 3, based on the hash values of words in the example dictionary as depicted in Table 4, respective second mappings between the hash values of sensitive data records 1, 2, and 3, and respective hash values of segmented words thereof in Tables 1, 2, and 3, an example co-occurrence matrix M may be built. With reference now to FIG. 6, the example co-occurrence matrix M600 is depicted in Table 600 according to embodiments of present invention. In co-occurrence matrix M, row encrypted words and column encrypted words respectively include hash values of words "One", "Bernard", "Baruch", "Way", "New", "York", "Brooklyn", "42nd", "Street", "Metrotech" and "Center" as shown in Table 4 above. $M_{ij}$ indicates the number of times a row encrypted word and a column encrypted word co-concur in a hash value of sensitive data records 1, 2, and 3. For example, $M_{12}$ (i.e., M row 1, column 2) corresponding to number "1" in entry 601 indicates row encrypted word "a61 . . . a6f" and column encrypted word "3be . . . 05c" co-occur once in the hash values of sensitive data records 1, 2, and 3. $M_{1110}$ corresponding to number "3" in entry 602 indicates row encrypted word "52e . . . e61" and column encrypted word "6d6 . . . 5b6" co-occur three times in the hash values of sensitive data records 1, 2, and 3. Based on co-occurrence matrix M and a second mapping between a hash value of an original data record and hash values of segmented words thereof, co-occurrence statistics model 405 may provide a co-occurrence weight indicating a probability that a hash value of at least one word appears in the hash value of the original data record.

A Co-occurrence statistics model including a co-occurrence matrix is only one example and is not intended to suggest any limitation as to the scope of present invention described herein. As appreciated in the art, in Natural Language Processing (NLP), many methods may be used to compute the co-occurrence weight. For example, these methods include, but are not limited to, N-gram, Skip-gram, word2vec, etc.

Figure 7:
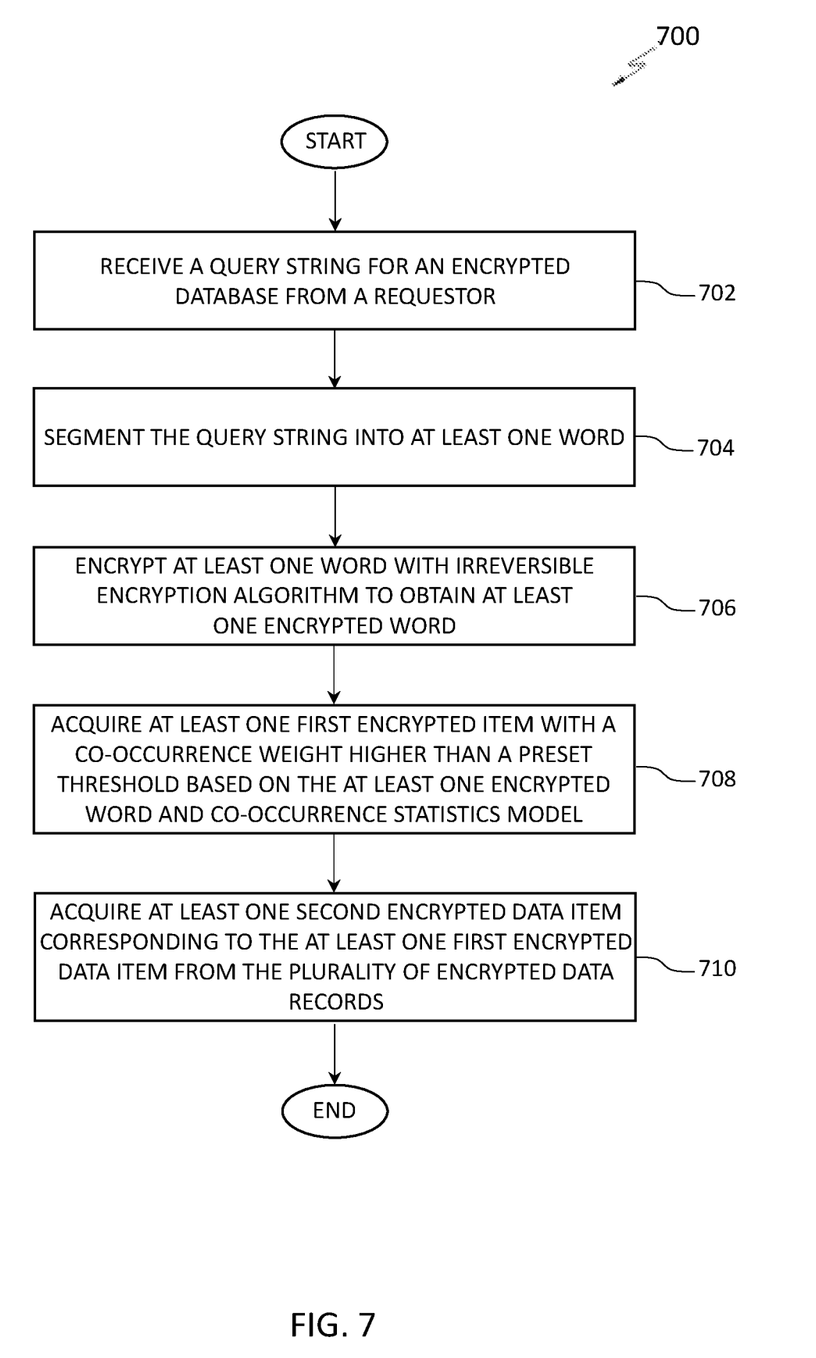
FIG. 7 depicts a flowchart of an example method for data query, according to some embodiments of the present invention.

With reference now to FIG. 7, an example flowchart depicting workflow 700 for data query is provided according to some embodiments of the present invention. Workflow 700 may be implemented by system 400. Workflow 700 may comprise steps 702-710.

At step 702, system 400 via data query system 402 receives a query string from a requestor for encrypted database 407. As depicted in step 504, encrypted database 407 may include a plurality of encrypted data records. The plurality of encrypted data records are obtained through encryption of a plurality of original data records. Each of the plurality of encrypted data records may include a first encrypted data item and a second encrypted data item. The first encrypted data item may be obtained by encrypting an original data record with an irreversible encryption algorithm. The second encrypted data item may be obtained by encrypting the original data record with a reversible encryption algorithm. A plurality of respective first encrypted data items for the original data records may be used as an index for searching encrypted database 407.

At step 704, system 400 via pre-processor 403 segments the query string into at least one word. The implementation of segmentation may refer to step 506, which is not repeated here. By way of example, data query system 402 receives the query string "Center Brooklyn" from a requestor. After segmentation, the query string "Center Brooklyn" may be segmented into the two words "Center" and "Brooklyn".

At step 706, system 400 via encryption module 404 encrypts at least one word with the irreversible encryption algorithm to obtain at least one encrypted word. Note that the irreversible encryption algorithm herein is the same as those used in steps 504 and 508 above. By way of example, with the irreversible encryption algorithm, the segmented words "Center" and "Brooklyn" are respectively encrypted into hash values "40f . . . b75" and "3d0 . . . 36e".

At step 708, system 400 via data query system 402 acquires at least one first encrypted item with a co-occurrence weight higher than a preset threshold based on the at least one encrypted word and co-occurrence statistics model 405. As depicted in step 512 above, co-occurrence statistics model 405 may be built to provide co-occurrence weights respectively indicating a probability that at least one encrypted word appears in the first encrypted data items of a plurality of encrypted data records.

In an embodiment, using the at least one encrypted word as input, co-occurrence statistics model 405 can output co-occurrence weights respectively indicating a probability that at least one encrypted word appears in the first encrypted data items of a plurality of encrypted data records. By way of example, given a corpus which includes sensitive data records 1, 2, and 3 and co-occurrence statistics model 405 (which includes co-occurrence matrix M), using hash values "40f . . . b75" and "3d0 . . . 36e" of segmented words "Center" and "Brooklyn" as input, co-occurrence statistics model 405 may provide co-occurrence weights respectively indicating a probability that hash values "40f . . . b75" and "3d0 . . . 36e" appears in hash values of encrypted sensitive data records 1, 2, and 3. In co-occurrence matrix M, $M_{89}$ with the row encrypted word "40f . . . b75" and the column encrypted word "3d0 . . . 36e" corresponding to a number "1" in entry 603 indicates row encrypted word "40f . . . b75" and column encrypted word "3d0 . . . 36e" co-occur once in the hash values of sensitive data records 1, 2, and 3. Based on Table 3 above, co-occurrence statistics model 405 may retrieve a hash value of sensitive data record 3 "0eb . . . c87" mapping with hash values "40f . . . b75" and "3d0 . . . 36e". As a result, co-occurrence statistics model 405 may determine a co-occurrence weight for sensitive data record 1 as 0, which indicates that the probability that hash values "40f . . . b75" and "3d0 . . . 36e" appear in the hash values of sensitive data record 1 is 0. Co-occurrence statistics model 405 may determine a co-occurrence weight for sensitive data record 2 as 0, which indicates that the probability that hash values "40f . . . b75" and "3d0 . . . 36e" appear in the hash value of sensitive data record 2 is 0. Co-occurrence statistics model 405 may determine a co-occurrence weight for sensitive data record 3 as 100%, which indicates that the probability that hash values "40f . . . b75" and "3d0 . . . 36e" appear in the hash value of sensitive data record 3 is 100%. Assuming a preset threshold being 50%, data query system 402 may acquire the hash value "0eb . . . c87" of sensitive data record 3 with co-occurrence weight of 100%.

At step 710, system 400 via index mapping module 406 acquires at least one second encrypted data item corresponding to the at least one first encrypted data item from the plurality of encrypted data records. As depicted in step 504 above, for each encrypted data record, encryption module 404 may establish a first mapping between a first encrypted data item and a second encrypted data item. Using the at least one first encrypted data item as an index, index mapping module 406 may acquire at least one second encrypted data item mapping with the at least one encrypted data item. By way of example, using the hash value "0eb . . . c87" of sensitive data record 3 as an index, index mapping module 406 may acquire a second encrypted data item mapping with the hash value of "0eb . . . c87" of sensitive data record 3 from an example encryption data structure for encrypted sensitive data records 1, 2, and 3. The second encrypted data item including "text", "nonce" and "salt" is shown as below.

```
{"text": "84b...613",
 "nonce": "421dcab5568171bc5e85dc75",
 "salt": "253293f61beb5b9a4ae717515e04d2e9".}
```

Then, system 400 via decryption module 408 decrypts the at least one second encrypted data item to acquire at least one original data record. As described above, the at least one second encrypted data are obtained by encrypting at least one original data record with a reversible encryption algorithm. Therefore, it is feasible to acquire at least one original data record by decrypting the at least one second encrypted data item. By way of example, using "text", "nonce" and "salt" together with an additional key, the second encrypted data item may be decrypted to a plain text "Metrotech Center, Brooklyn, New York". Data query system 402 may return the at least one original data record to the requestor. In this manner, the plain text of the at least one original data record may be sent back to the requestor as a query result.

According to the present invention, instead of decrypting encrypted data, indexing and querying can be performed on encrypted data. Therefore, the performance and security of the query against encrypted database can be guaranteed.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wire transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving a plurality of unencrypted sensitive data records with each unencrypted sensitive data record including plain text data;
for each given unencrypted sensitive data record of the plurality of sensitive data records, encrypting the plain text of the given unencrypted data record with a SHA-512 hash function to generate a respectively corresponding fixed length hash value for the plain text of the given unencrypted sensitive data record;
generating a cryptographic key for the given unencrypted sensitive data record using
a password-based derivation function combined with a secret key,
a random salt parameter,
an SHA-512—(Secure Hash Algorithm 512) pseudo-random function and
an iterations number;
for each given unencrypted sensitive data record of each the plurality of unencrypted sensitive data record, reversibly encrypting the given unencrypted sensitive data record using an AES (Advanced Encryption Standard) encryption algorithm to generate a respectively corresponding reversibly encrypted sensitive data record, wherein generating the reversibly encrypted sensitive data record comprises generating a cipher text as an AES block cipher combined with the cryptographic key and a unique nonce parameter;
for each given reversibly encrypted sensitive data record, storing the given reversibly encrypted sensitive data record at a respectively corresponding storage address;
for each fixed length hash value, creating an entry in a mapping table to map the fixed length hash value to the storage address of the corresponding reversibly encrypted sensitive data record;
receiving, by one or more processing units, a query string from a requestor for a first reversibly encrypted sensitive data record, with the query string including a first fixed length hash value corresponding to the first reversibly encrypted sensitive data record; and
acquiring, by one or more processing units, the first reversibly encrypted sensitive data record using the fixed length hash value and the mapping table to locate the storage address of the first reversibly encrypted sensitive data record.

2. A computer program product (CPP) comprising:
a set of non-transitory storage device(s); and
computer code stored collectively in the set of non-transitory storage device(s), with the computer code including data and instructions to cause a processor(s) set to perform at least the following operations:

receiving a plurality of unencrypted sensitive data records with each unencrypted sensitive data record including plain text data;

for each given unencrypted sensitive data record of the plurality of sensitive data records, encrypting the plain text of the given unencrypted data record with a SHA-512 hash function to generate a respectively corresponding fixed length hash value for the plain text of the given unencrypted sensitive data record;

generating a cryptographic key for the given unencrypted sensitive data record using a password-based derivation function combined with a secret key, a random salt parameter, an SHA-512—(Secure Hash Algorithm 512) pseudo-random function and an iterations number;

for each given unencrypted sensitive data record of each the plurality of unencrypted sensitive data record, reversibly encrypting the given unencrypted sensitive data record using an AES (Advanced Encryption Standard) encryption algorithm to generate a respectively corresponding reversibly encrypted sensitive data record, wherein generating the reversibly encrypted sensitive data record comprises generating a cipher text as an AES block cipher combined with the cryptographic key and a unique nonce parameter;

for each given reversibly encrypted sensitive data record, storing the given reversibly encrypted sensitive data record at a respectively corresponding storage address;

for each fixed length hash value, creating an entry in a mapping table to map the fixed length hash value to the storage address of the corresponding reversibly encrypted sensitive data record;

receiving, by one or more processing units, a query string from a requestor for a first reversibly encrypted sensitive data record, with the query string including a first fixed length hash value corresponding to the first reversibly encrypted sensitive data record; and acquiring, by one or more processing units, the first reversibly encrypted sensitive data record using the fixed length hash value and the mapping table to locate the storage address of the first reversibly encrypted sensitive data record.

3. A computer system (CS) comprising:

a processor(s) set;

a set of storage device(s); and computer code stored collectively in the set of storage device(s), with the computer code including data and instructions to cause the processor(s) set to perform at least the following operations:

receiving a plurality of unencrypted sensitive data records with each unencrypted sensitive data record including plain text data;

for each given unencrypted sensitive data record of the plurality of sensitive data records, encrypting the plain text of the given unencrypted data record with a SHA-512 hash function to generate a respectively corresponding fixed length hash value for the plain text of the given unencrypted sensitive data record;

generating a cryptographic key for the given unencrypted sensitive data record using a password-based derivation function combined with a secret key, a random salt parameter, an SHA-512—(Secure Hash Algorithm 512) pseudo-random function and an iterations number;

for each given unencrypted sensitive data record of each the plurality of unencrypted sensitive data record, reversibly encrypting the given unencrypted sensitive data record using an AES (Advanced Encryption Standard) encryption algorithm to generate a respectively corresponding reversibly encrypted sensitive data record, wherein generating the reversibly encrypted sensitive data record comprises generating a cipher text as an AES block cipher combined with the cryptographic key and a unique nonce parameter;

for each given reversibly encrypted sensitive data record, storing the given reversibly encrypted sensitive data record at a respectively corresponding storage address;

for each fixed length hash value, creating an entry in a mapping table to map the fixed length hash value to the storage address of the corresponding reversibly encrypted sensitive data record;

receiving, by one or more processing units, a query string from a requestor for a first reversibly encrypted sensitive data record, with the query string including a first fixed length hash value corresponding to the first reversibly encrypted sensitive data record; and acquiring, by one or more processing units, the first reversibly encrypted sensitive data record using the fixed length hash value and the mapping table to locate the storage address of the first reversibly encrypted sensitive data record.

* * * * *